March 22, 1966 S. F. WOLFE 3,241,765
POWER RAIL SYSTEM WITH REMOVABLE MEMBERS
Filed June 19, 1962 4 Sheets-Sheet 1
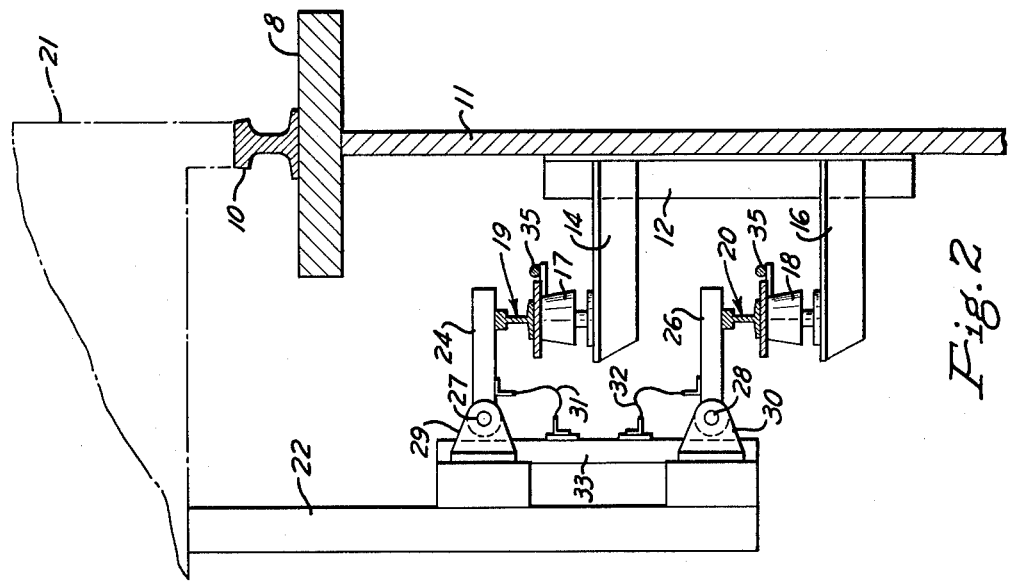
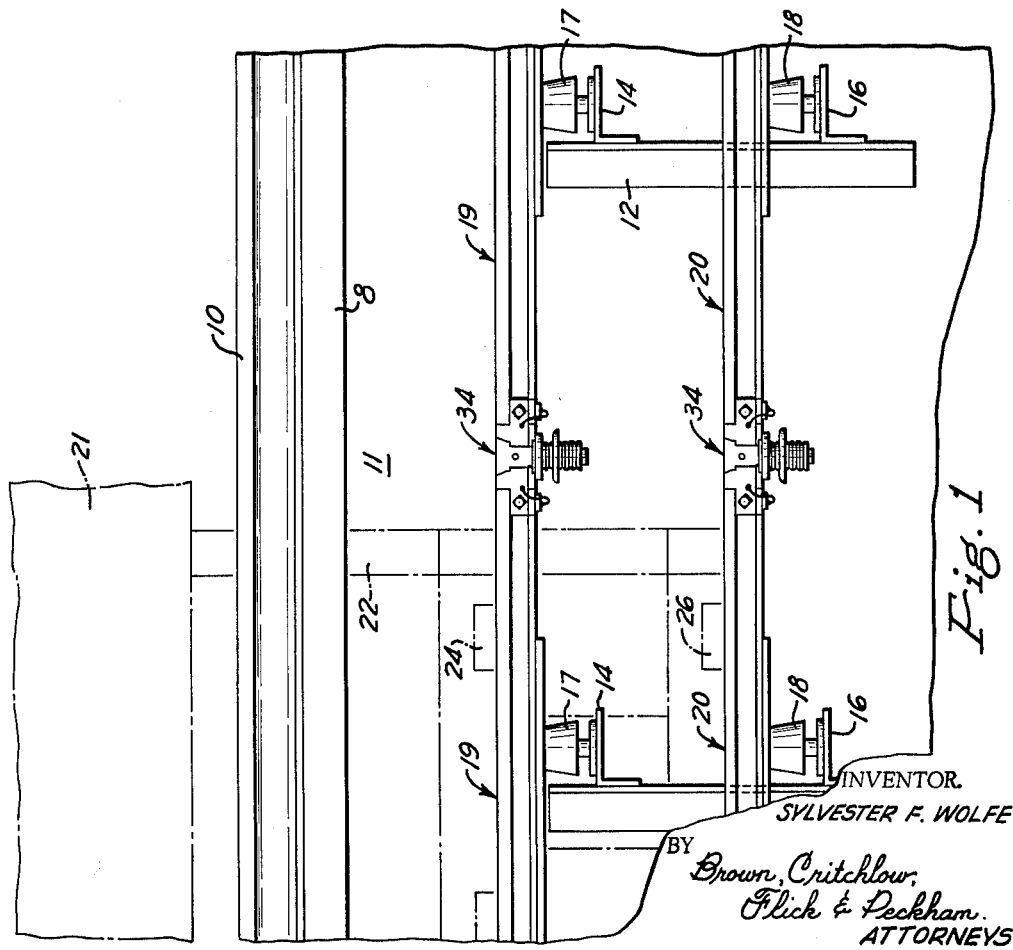
INVENTOR.
SYLVESTER F. WOLFE
BY Brown, Critchlow,
Flick & Peckham.
ATTORNEYS.

March 22, 1966  S. F. WOLFE  3,241,765
POWER RAIL SYSTEM WITH REMOVABLE MEMBERS
Filed June 19, 1962  4 Sheets-Sheet 3

INVENTOR.
SYLVESTER F. WOLFE
BY
Brown, Critchlow, Flick & Peckham
ATTORNEYS.

March 22, 1966 S. F. WOLFE 3,241,765
POWER RAIL SYSTEM WITH REMOVABLE MEMBERS
Filed June 19, 1962 4 Sheets-Sheet 4

INVENTOR.
SYLVESTER F. WOLFE
BY Brown, Critchlow,
Flick & Peckham.
ATTORNEYS

United States Patent Office 3,241,765
Patented Mar. 22, 1966

3,241,765
POWER RAIL SYSTEM WITH REMOVABLE MEMBERS
Sylvester F. Wolfe, 2918 Arlington Ave., Pittsburgh, Pa.
Filed June 19, 1962, Ser. No. 203,539
7 Claims. (Cl. 238—14.05)

This invention relates to main collector systems used, for example, for the simultaneous operation of more than a single piece of heavy equipment.

Overhead cranes that are used in steel mills often are operated so that a plurality of them, frequently four or more, are on the same set of rails. Conventionally, power for their operation is obtained from a pair of rails, spaced and insulated from the cranes, from which power is obtained by sliding shoes supported from the crane cab. The duty of repairing or replacing worn out shoes or other parts of this system when current is flowing through the power rails is extremely hazardous. On the other hand, if the power is turned off in order to accomplish such operations, the other cranes are unnecessarily immobilized.

It is therefore the primary object of the present invention to provide power rails with removable breakers in a fashion whereby a specific piece of operating equipment can be electrically isolated without unnecessarily disturbing operation of other equipment drawing power from the same power supply rails.

It is another object of the invention to provide power rails in accordance with the preceding object in which a visual indication of safety for repairmen is provided and accidental leakage of current to portions of the rail intended to be isolated is avoided.

Other objects will become apparent from the following detailed description of the invention presented in conjunction with the attached drawings in which:

FIG. 1 is a diagrammatic side view of a partial assembly of power rails and operating equipment in accordance with the present invention;

FIG. 2 is an end view of the assembly of FIG. 1;

Figure 3:
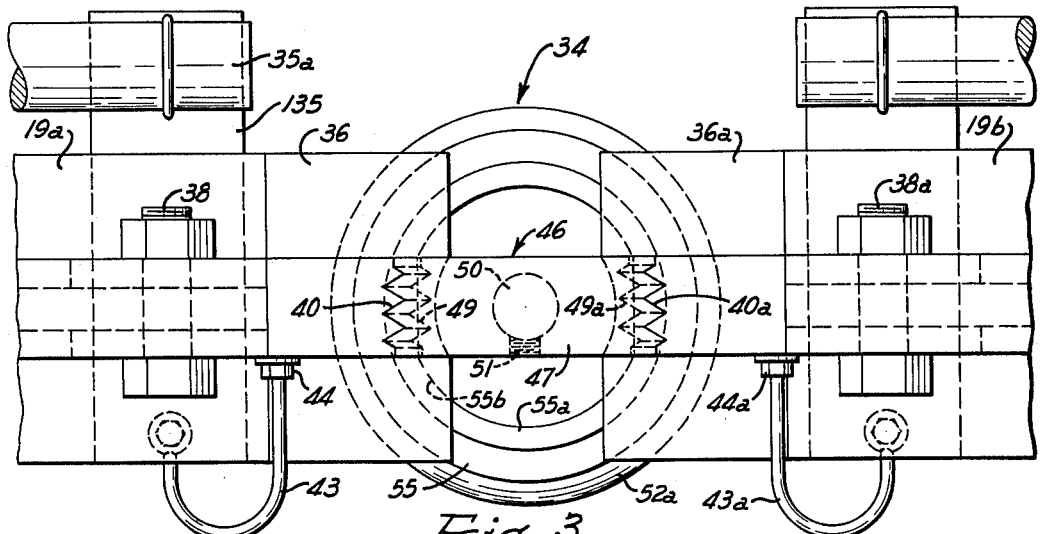
FIG. 3 is a top view of a part of a power rail and removable breaker assembly of the invention.
Figure 4:
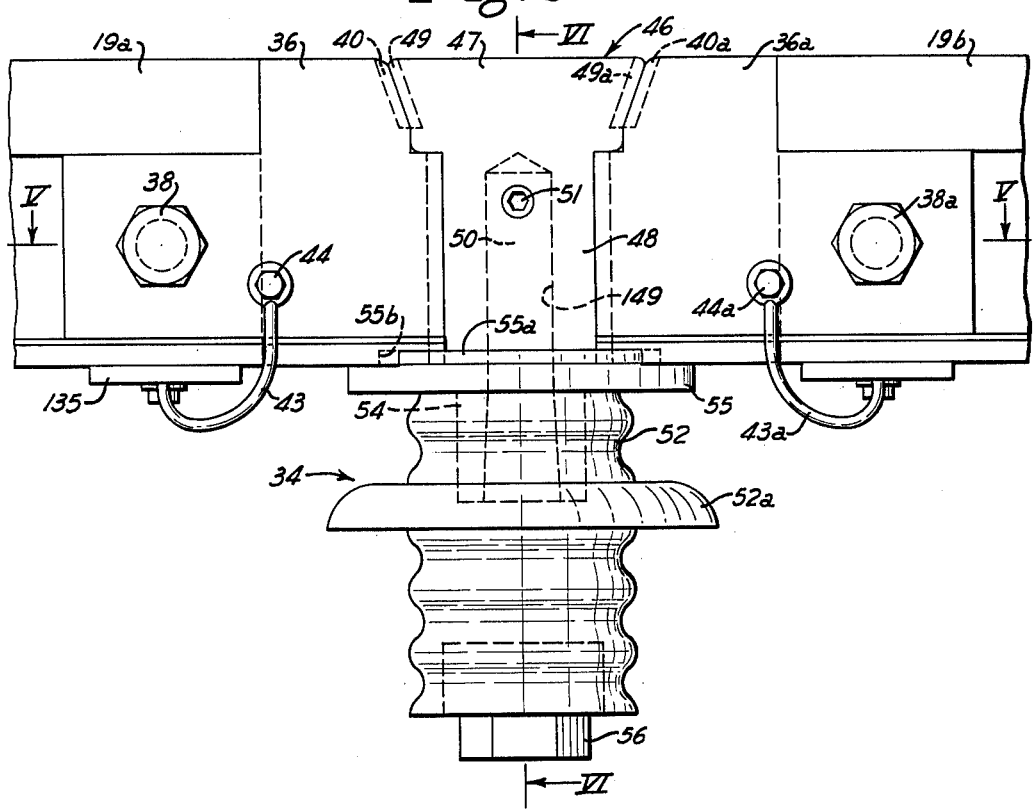
FIG. 4 is a side view of the rail and removable breaker assembly of FIG. 3.
Figure 5:
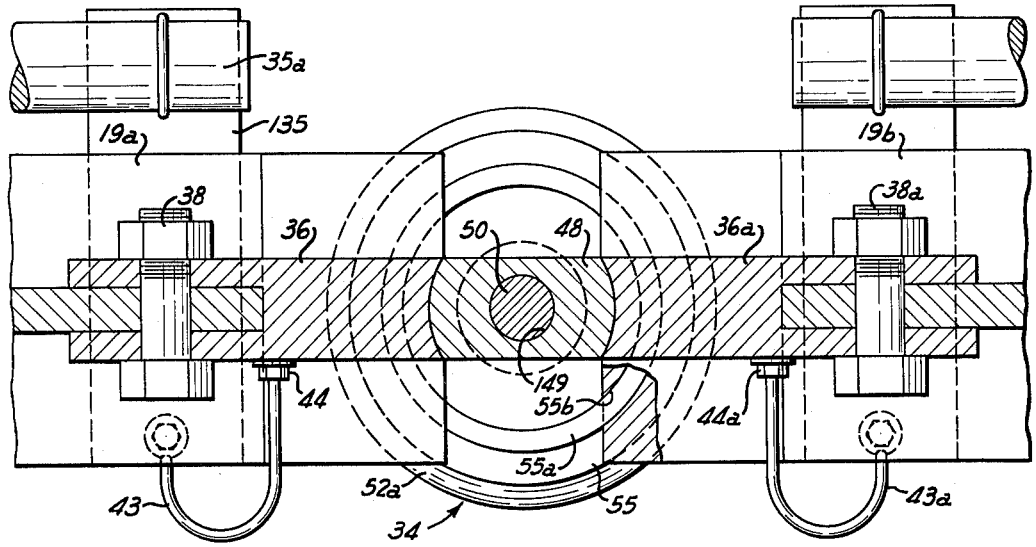
FIG. 5 is a view taken along line V—V of FIG. 4.

For purposes of illustration only, the invention will be described with regard to its use with conventional overhead cranes that are used in steel mills, though it should be understood that the invention is equally applicable to other uses such as for ore bridges and the like.

Referring now to FIGS. 1 and 2, there is shown a running rail 10 mounted on a series of ties 8 on a supporting girder 11. At the side of girder 11 is a steel angle 12 rigidly attached to web of the girder. Two horizontal supporting members 14 and 16 that are generally parallel to and are spaced from one another are attached to the member 12. At their outer ends, members 14 and 16 support rail insulators 17 and 18, respectively. On the top of each of insulators 17 and 18 are conventional power rails 19 and 20 through which power is supplied from a source, not shown, to the operating equipment in a manner to be discussed hereinafter. For purposes of illustration, all rails that are disclosed are of the conventional type having a top head portion, an intermediate web portion, and a bottom or flange portion. However, it will be understood that the shape of the rail is not of critical importance to the invention and any other type desired may be used.

The electrical equipment that is to be operated by the system and which may be cranes, are supported in the conventional fashion on the running rail 10. Actually, two such rails usually are employed but only one is shown for purposes of illustration and simplification. Extending downwardly from the side of the crane 21 is a beam 22 through which power cables are led to the cab motive unit. Beam 22 supports horizontal shoes 24 and 26 that, at their lower surfaces, engage the heads of power rails 19 and 20, respectively. The shoes 24 and 26 are pivotedly mounted through pins 27 and 28 extending through suitable brackets 29 and 30 that are attached, preferably through an insulator such as a board 33, to the beam 22. Shoes 24 and 26 are electrical conductors made of a metal such as cast iron or bronze. Separate cables 31 and 32 are attached to the shoes as by soldering them to projections from the shoes or in any manner desired that insures good electrical contact. The other ends of these cables are anchored to a member 33, that may be wood or other insulating material, that is supported by the beam 22. While not shown, the cables are then led along beam 22 to the motive unit of the equipment on the running rails in the usual fashion.

The power rails 19 and 20 each are composed of a plurality of rail sections that are aligned and each group of such sections composes a rail. Adjacent ends of the sections of the power rails are spaced from one another to define, in the absence of other structure, substantial air gaps. In accordance with the discoveries of the present invention, these air gaps are closed by an assembly indicated generally in FIG. 1 by the numeral 34 that may be designated a power rail breaker assembly.

Power is supplied to the power rails by means of buss cables 35 (FIG. 2), generally bare copper wires of substantial diameter, supported along the flange of the power rails. Current flows to the rails by direct contact or by separate short leads from the cables at a plurality of locations along their lengths. These numerous points of contact minimize the effect of the resistance of the rail itself, which normally is a steel chosen for its wear, hardness, and similar characteristics rather than low electrical resistance. The buss cables actually are a plurality of sections of such cables, each section being substantially as long as the rail section with which it is associated. As will become apparent, the ends of the buss cables are anchored by special leads, to portions of the power line breaker assemblies 34. The power line breaker assemblies 34 are removable and when sequential assemblies are removed from a power rail, the section of the rail between those sequential assemblies is effectively isolated electrically since those assemblies also serve as the contacts for adjacent ends of buss cable sections. Since the assemblies do serve a current carrying function in use, it may be desirable to construct all of its parts between the rails of copper except as otherwise indicated hereinafter.

Details of the power line breaker assemblies can be noted in FIGS. 3, 4, 5 and 6, which will now be discussed as a group. For purposes of this discussion, it is assumed that the power line breaker assembly shown in FIGS. 3, 4, 5 and 6, is associated with power rail 19. The assembly includes a pair of members 36 and 36a each having an L-shaped plan section as viewed from the side, and conforming in shape at their top to the head section of portions 19a and 19b of power rail 19.

Members 36 and 36a are essentially identical and therefore attention need be given to the details of but one of the members, but the same member coupled with an "a" is applied to the corresponding part of the other member. In the bottom leg of its L-shape, member 36 is bifurcated to receive the web portion of the power rail section 19a. A bore through each fork of this portion of member 36 is provided to receive a nut and bolt unit 38 so that it can be removably attached to rail section 19a. At the side of its head portion remote from rail section 19a, member 36 is provided with serrations or teeth depressions 40. A copper buss cable 43 is attached to member 36 by a screw 44. The buss cable 43 is led to the main buss cable section 35a associated with power rail section 19a through a conducting flange 135 used also to support cable 35a.

As noted, two members 36 and 36a are provided, one on the end of each of the sections of the power rails that are adjacent to one another. The size of these members is such that a substantial air gap remains even after they are adjacent to one another. The size of these members that air gap is located a generally T-shaped air gap closing or bridging member 46 that has a head portion 47 of a size and shape essentially that of the head of the power rails and a shank portion 48 of the thickness of the bifurcated portion of member 36. The head portion 47 of the air gap closing member 46 is serrated or has teeth 49 and 49a at its ends adapted to seat in the teeth 40 and 40a in the adjacent members 36 and 36a. Accordingly, when air gap closing member 46 is seated between members 36 and 36a, rotational movement of it is prevented.

Figure 6:
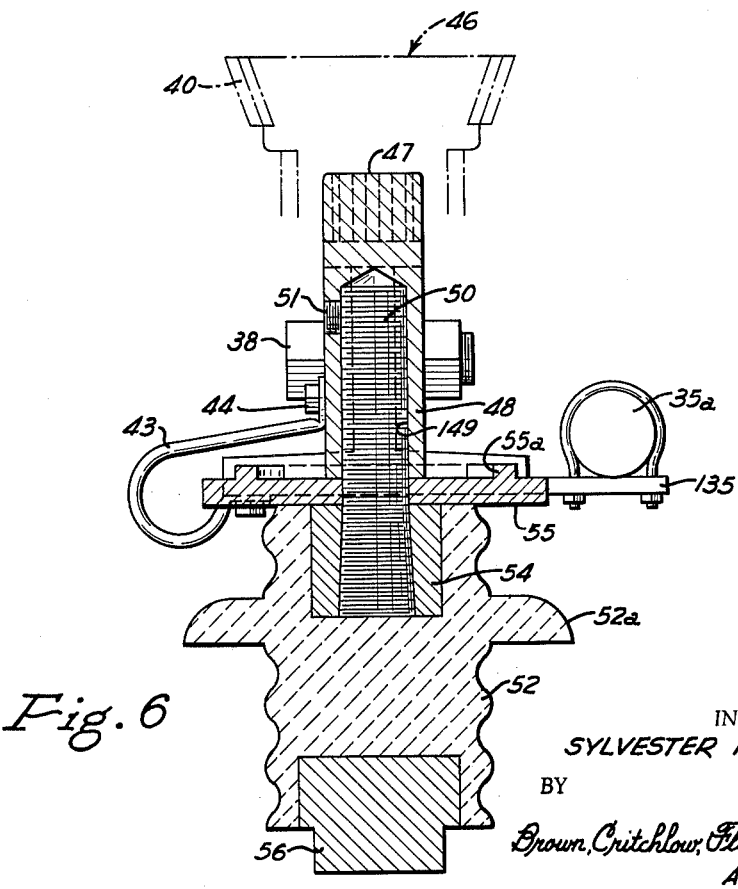
FIG. 6 is a view taken along line VI—VI of FIG. 4.

Within the shank portion 48 of the air gap closing member 46 is a threaded bore 149 (FIG. 6). A rod 50 that is threaded and that extends below the flange of the power rails is received by the threaded bore 149 and is fixed to the shank portion 48 of the air gap closing member 46 by a screw 51. On the lower threaded end of the rod 50 is threaded a handle 52, suitably made of porcelain or other insulating material, and preferably is contoured so that a good grip on it can be had. An annular flange 52a about its mid-portion serves as a hand-protector against accidental slippage to the electrically live air gap closing assembly 46. The threads in insulating handle 52, which are located on a suitable insert 54 of metal or hard plastic in a bore adapted to receive it, are cut such that when the handle 52 is screwed downwardly, the mating of its threads and those on the bottom of rod 50 become tight for reasons which will become apparent hereinafter. Alternatively, the bottom portion of rod 50 can be split and expanded to accomplish the same objective. Along the top surface of the insulating handle 52 is a washer 55 of a diameter larger than the air gap between members 36 and 36a. The central bore of washer 55 is sufficient to receive the rod 50 but does not permit either the bottom 48 of air gap closing member 46 or the body of handle 52 to pass. The washer 55 is provided with a circular boss 55a on its upper surface that is received in grooves 55b in the members 36 and 36a. This boss largely serves to keep the rails which are bolted to members 36 and 36a from moving away from one another under the forces applied through the shoes of the cranes. The lower end of insulating handle 52 may be provided with a nut 56 of any conventional type that may be available to apply a wrench, if needed, to turn handle 52 in operation of the unit.

When it is desired to isolate a particular portion of a power rail, a positive air gap is created as follows: With the switches of the crane or other equipment to be isolated off, the handle 52 is unscrewed relative to rod 50 until it has been lowered a distance along rod 50 at least equal to the depth of the teeth 49 and 49a in the head portion 47 of the air gap closing member 46. In view of the nature of the threaded connection between the insulating handle 52 and rod 50 as above described, these two members are now in strong frictional engagement. At this point, the handle is raised upwardly sufficiently such that the teeth 49 and 49a on the top forward portion 47 rise out of the teeth 40 and 40a of members 36 and 36a and above the upper surface of the power rail sections 19a and 19b. Then the unit is rotated approximately 90° about its vertical axis. The turned head portion is shown in dotted lines at the top of FIG. 6 simply for illustrative purposes. It is then withdrawn by being removed laterally or lowered through the space between members 36 and 36a, thereby providing an effective air gap or disconnection between the adjacent portions 19a and 19b of the power rail 19. By removal of the air gap closing member associated with the other end of the power rail section 19a, that rail portion (19a) of the power rail is wholly isolated from the circuit and the workman can proceed with repair or replacement of parts in complete safety despite the fact that current continues to flow in the remainder of that power rail. With two-power rail systems, as will be apparent to the artisan, a total of four air gap closing members (two from each rail) should be removed before repair starts.

Figure 7:
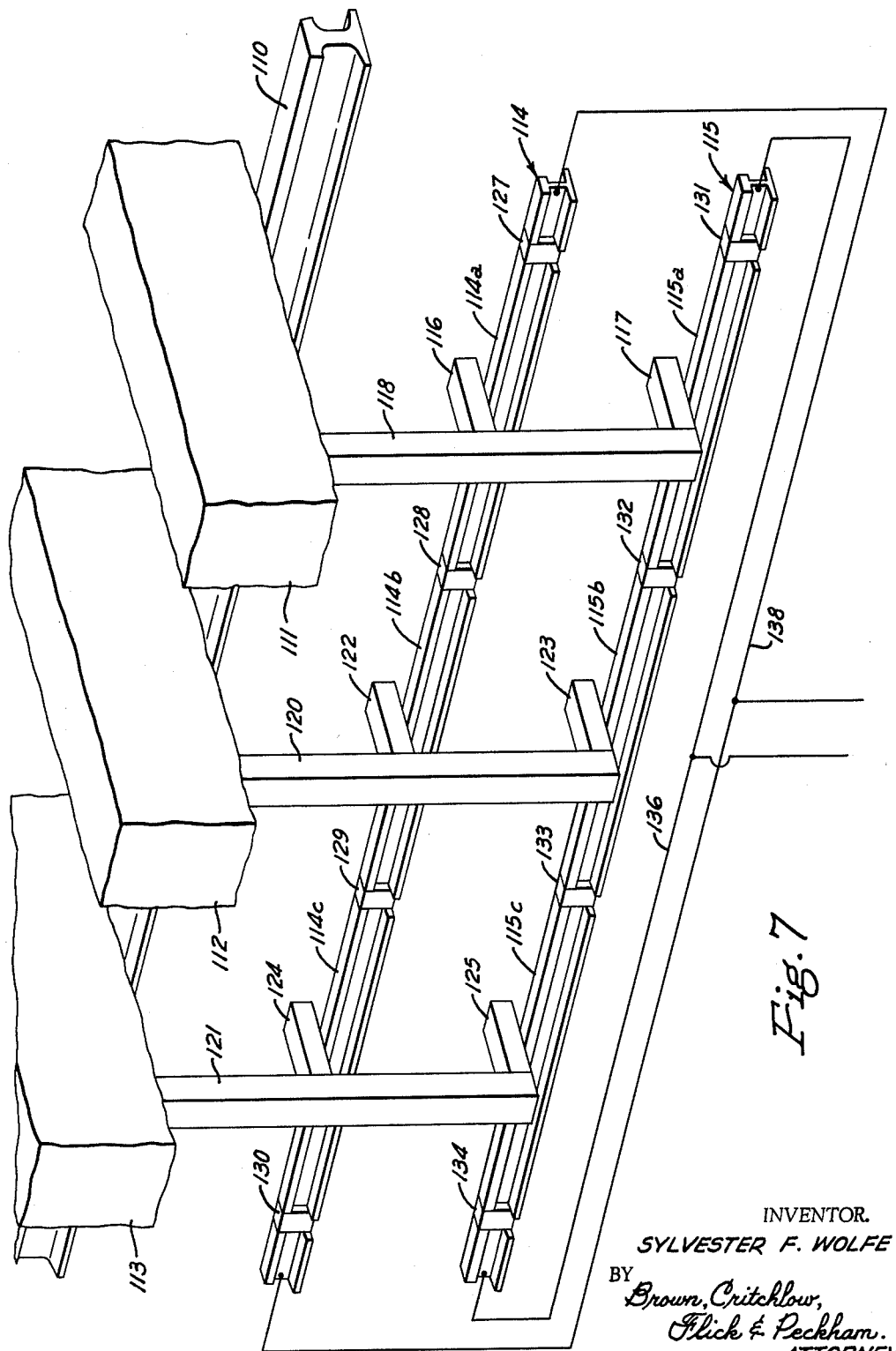
FIG. 7 is a diagrammatic perspective view of a set of power rails and a running rail with units of equipment operatively aligned showing a particular manner of applying power to a system in accordance with the invention.

Another aspect of the present invention is indicated in the diagrammatic perspective view of a set of power rails and a running rail shown in FIG. 7. In FIG. 7, running rail 110 supports three spaced units 111, 112 and 113 of operating equipment that may be considered to be cranes, for purposes of illustration. Current for the operating equipment 111 is taken from the power rails 114 and 115 by shoes 116 and 117 that are supported from a beam 118 extending downwardly from the equipment 111. Similarly, current to operate equipment 112 and 113 is led through lines in beams 120 and 121, respectively. Shoes 122 and 123 are provided on beam 120, while similar shoes 124 and 125 serve as current collectors to beam 121. Each power rail is composed of a plurality of sections, being 114a, 114b and 114c with respect to power rail 114 and 115a and 115b and 115c with respect to power rail 115. These sections are electrically joined by air gap closure assemblies 127 through 134 as shown. Power is supplied to the power rails from a source, not shown, by buss cables 136 and 138. As indicated in FIG. 7, cable 136 is attached to each end of power rail 115 while cable 138 is attached to each end of the power cable 114.

This arrangement permits the isolation of any given piece of equipment without affecting operation of the others. For example, upon the removal of air gap assembles 128, 129, 132 and 133, rail sections 114b and 115b, which serve operating equipment 112, are electrically isolated by the resulting air gaps. Accordingly, no power can possibly flow to equipment crane 112. Power, on the other hand, continues to flow to equipment units 111 and 113 since their electrical connections are completed through their respective shoes, power rails, and cables since those cables deliver current from each end of the power rails.

From the foregoing discussion and description, it will be evident that the present invention provides a unique system whereby marked safety is introduced into the repair and replacement incident to the operation of a plurality of units of equipment operating from a common source of power equipment without disturbing use of the equipment needing no repair. While the invention has been described with respect to a detailed specific embodiment, it should be understood that changes can be made without departing from its scope. By way of example, members 36 and 36a may be omitted. In that event, the adjacent rail ends would be notched sufficiently to remove part of the head portions of each. The air gap closing insert then would be shaped to provide a continuous head between the rails and a forked bottom member adapted to fit across the exposed webs at the aforementioned notches. In this or other embodiments, the seating teeth referred to may be omitted with a sufficiently tight fit being obtained simply through the extent of the abutting portions of the rail heads and the insert. Disconnecting assemblies differing from that shown may also be used. For example, the insulating handle piece can be fixed to the head insert. The handle can be spaced from the bottom of the assembly by a spring exerting its force against a washer extending between the rails and a flange or the like on the handle. Then the assembly could be removed by forcing the handle upwardly against the force of the spring sufficiently to raise the head portion of the insert above the webs of the rails. Once that position has been achieved, the unit can be rotated about a vertical axis 90° as before and be withdrawn downwardly and out of the unit. Other changes will occur to those skilled in the art.

In accordance with the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A subcombination to physically and electrically join adjacent ends of spaced sections of power rails comprising a generally T-shaped member having its head portion shaped similarly to the head of a rail and having an integral shank portion, a bore in said shank portion, a rod having one end removably attached to said shank portion in its bore, an insulating handle attached to the other end of said rod below said shank portion, and means operatively connecting said rod and said handle whereby in one position of said handle the T-shaped member can be seated between the adjacent ends of said rail sections and in another position of said handle the T-shaped member can be raised above its seated position, rotated about its axis and then be withdrawn from the space it occupied between those rails.

2. A subcombination in accordance with claim 1 in which the handle threadingly engages the bottom of the rod whereby in its fully threaded position it forceably seats the T-shaped member, and in an unthreaded position sufficient space is defined between the bottom of the shank and the top of the handle, such that upon raising the handle the T-shaped member rises from its seat to be rotated and then is withdrawn.

3. In an electric power rail system, the combination with a pair of aligned metal rails spaced apart longitudinally to provide an air gap between them and having upper surfaces for engagement by a current collector movable along them, of a metal bridging member normally disposed in said gap in engagement with the adjacent ends of the rails to bridge the gap, said ends of the rails having seating surfaces within the gap supporting said member with its upper surface flush with said rail upper surfaces to form a continuation thereof, and clamping means connected to the bottom of said bridging member and extending below the rails, said means comprising vertically movable means normally pressed tightly against the bottoms of the rails and manually movable downwardly away from them so that said bridging member can be withdrawn through said air gap.

4. In an electric power rail system according to claim 3, said bridging member and rail ends being provided with downwardly extending interengaging teeth holding the bridging member in alignment with the rails.

5. In an electric power rail system according to claim 3, said clamping means including a handle supported by the bridging member and adapted to be screwed upwardly relative thereto to pull the bridging member tightly against said seating surfaces.

6. In an electric power rail system, the combination with a pair of aligned metal rails spaced apart longitudinally to provide an air gap between them and having upper surfaces for engagement by a current collector movable along them, of a metal bridging member normally disposed in said gap in engagement with the adjacent ends of the rails to bridge the gap, said ends of the rails having seating surfaces within the gap supporting said member with its upper surface flush with said rail upper surfaces to form a continuation thereof, said rail ends also having within the gap opposed vertical surfaces forming arcs of a circle with the bridging member fitting between them, and clamping means connected to the bottom of said bridging member and extending below the rails, said means comprising vertically movable means normally pressed tightly against the bottoms of the rails and manually movable downwardly away from them so that said bridging member can be rotated to disengage it from said arcuate supporting surfaces and then removed from said air gap.

7. In an electric power rail system, the combination with a pair of aligned metal rails spaced apart longitudinally to provide an air gap between them and having upper surfaces for engagement by a current collector movable along them, of a metal bridging member normally disposed in said gap in engagement with the adjacent ends of the rails to bridge the gap, said ends of the rails having seating surfaces within the gap supporting said member with its upper surface flush with said rail upper surfaces to form a continuation thereof, a threaded rod rigidly mounted in the bridging member and extending below the rails, and a handle screwed on the lower end of the rod and normally pulling the bridging member down tightly against said seating surfaces, said handle being adapted to be partially unscrewed from said rod to permit the bridging member to be withdrawn through said air gap.

References Cited by the Examiner

UNITED STATES PATENTS

| Re. 14,372 | 10/1917 | Farmer | 200—158 |
| 952,004 | 3/1910 | Edwards | 191—29 X |
| 1,607,216 | 11/1926 | Stevens | 191—39 |
| 1,751,826 | 3/1930 | Marshall | 200—158 |
| 2,134,753 | 11/1938 | Fisher et al. | 339—22 |
| 2,495,569 | 1/1950 | Conrad | 191—39 X |
| 2,605,365 | 7/1952 | Becker et al. | 104—89 X |

FOREIGN PATENTS 246,606  10/1947  Switzerland.

ARTHUR L. LA POINT, *Primary Examiner.*

LEO QUACKENBUSH, JAMES S. SHANK, *Examiners.*

R. A. BERTSCH, *Assistant Examiner.*